Patented Aug. 30, 1949

2,480,453

UNITED STATES PATENT OFFICE 2,480,453

METHOD OF MANUFACTURING BODIES CONSISTING OF A CORE OF CHROME-IRON OR A SIMILAR CHROMIUM ALLOY AND OF A THIN LAYER ADAPTED TO FORM A METAL TO GLASS SEAL

Eduard Gerardus Dorgelo and Hendricus Johannes Lemmens, Eindhoven, Netherlands, assignors, by mesne assignments, to Hartford National Bank and Trust Company, Hartford, Conn., as trustee No Drawing. Application January 14, 1946, Serial No. 641,184. In the Netherlands November 11, 1943

Section 1, Public Law 690, August 8, 1946
Patent expires November 11, 1963

3 Claims. (Cl. 148—6.3)

This invention relates to a method of manufacturing bodies consisting of a core of chrome iron, nickelchrome or a similar chromium alloy and of a thin layer of another material. The bodies in question may have very different shapes; they may, for example, be plate-shaped, to an alternative, however, these bodies may be used in the form of wire, for example wires of a Lecher system, wires for coils, whilst also wire-shaped conductors enter into account which are to be used as current supply conductors in electric discharge tubes, more particularly for short and ultra-short waves. Conductors of this kind consist, for example, of a core of chrome iron coated with a thin layer of another metal such as, for instance nickel, silver, copper, or the like.

The invention also relates to bodies manufactured by means of the method according to the invention and to discharge tubes comprising such conductors.

In several cases the use of chrome iron bodies coated with a layer of another material entails disadvantages; this is for example, the case with the aforesaid supply conductors, because glass and metal adhere insufficiently together. Also in other cases drawbacks may be expected, for example, when making use of chrome iron bodies coated with a layer which is not stable in the atmosphere in which these bodies are used.

These drawbacks can be met to a considerable extent when making use of the method according to the present invention, which consists in heating a chrome iron conductor coated with a layer of another material for some time in a non-oxidizing atmosphere, at a temperature of about 800 to 1100° C., in such a manner that chromium diffuses out of the core body to the outside and deposits as a thin layer on the outer side of the body.

This method yields a great improvement in the use of the bodies set out before. The chromium diffusing through the surface layer forms a film on the outer side which is believed to consist of chromium oxide for the greater part. This film has a grey color and affords a suitable protection of the underlayers against any influences from without. In addition this layer largely promotes the adherence of glass to the conductor when this body is sealed into glass, for example, with parts of electric discharge tubes, incandescent lamps or the like.

The method according to the invention must be carried out in a non-oxidizing atmosphere, since otherwise there is the risk of the metal on the chrome iron core, for example nickel or copper, oxidizing too rapidly. Nevertheless, owing to the traces of oxygen always available, the chromium diffusing out of the core forms a thin film of chromium oxide on the outer side of the body. This film has a very small thickness, for example of the order of magnitude of from 0.1 to 1 micron.

As has been said above the heating temperature lies between 800 and 1100° C.; if this temperature is chosen too low, the diffusion lasts too long; when it is chosen too high, there is a risk of melting of the intermediate layer. The time during which the object is heated in order to obtain a sufficient diffusion depends on the temperature, on the thickness of the layer coating the chromium iron and on the method of applying this layer. Simply by experiment it can be easily determined how long it must be heated in definite cases. In the case of a thickness of 10 microns of the layer of copper applied electrolytically on to chrome iron and at a temperature of 1000° C. heating of about 15 minutes is sufficient to obtain a film of chromium oxide of some tenths of a micron. In the case of thicker intermediate layers of, for example 30 or 40 microns, this time may become much longer, for example, several hours.

In order that the invention may be clearly understood and readily carried into effect, it will now be set out more fully by giving an executional example, in which the method according to the invention is described.

A chrome iron wire to be used as a supply wire for short-wave tubes is coated electrolytically with a thin layer of copper of 20 microns and then heated at 1000° C. for 45 minutes in a reducing furnace; the conductor is then coated with a thin grey film of chromium oxide. The wire thus obtained is now sealed into a pinch or into a glass part formed in some way or other in the wall of an electric discharge tube; after that the tube is finished in a well-known manner.

What we claim is:

1. The method of manufacturing a metal element suitable for a metal to glass seal, comprising the steps of coating an alloy metal body containing chromium as a major constituent with a layer of another metal selected from the group consisting of nickel, copper and silver, heating the said coated body in an atmosphere containing only traces of an oxidizing agent to a temperature of about 800° C. to 1100° C. at which the chromium from said body diffuses through said coating, and maintaining said body at said temperature to form a film of chromium oxide on the outer side of said coating.

2. The method of manufacturing a metal element suitable for a metal to glass seal, comprising the steps of coating an iron alloy metal body containing chromium as a major constituent with a 20 micron layer of another metal selected from the group consisting of nickel, copper and silver, heating the said coated body in an atmosphere containing only traces of an oxidizing agent to a temperature of about 800° C. to 1000° C. at which the chromium from said body diffuses through said coating, and maintaining said body at said temperature to form a film of chromium oxide on the outer side of said coating.

3. The method of manufacturing a metal element suitable for a metal to glass seal, comprising the steps of coating a chromium-nickel metal body containing chromium as a major constituent with a layer of another metal selected from the group consisting of nickel, copper and silver, heating the said coated body in an atmosphere containing only traces of an oxidizing agent to a temperature in the region of 1000° C. at which the chromium from said body diffuses through said coating, and maintaining said body at said temperature to form a film of chromium oxide on the outer side of said coating.

EDUARD GERARDUS DORGELO.
HENDRICUS JOHANNES LEMMENS.

REFERENCES CITED

The following references are of record in the file of this patent:

UNITED STATES PATENTS

| Number | Name | Date |
| --- | --- | --- |
| 1,578,254 | Bennett | Mar. 30, 1926 |
| 1,989,236 | Laise | Jan. 29, 1935 |
| 2,044,742 | Armstrong et al. | June 16, 1936 |
| 2,156,262 | Fink et al. | May 2, 1939 |
| 2,219,738 | Copson | Oct. 29, 1940 |
| 2,334,020 | Miller et al. | Nov. 9, 1943 |
| 2,394,919 | Kingston | Feb. 12, 1946 |
| 2,402,834 | Nachtman | June 25, 1946 |

FOREIGN PATENTS

| Number | Country | Date |
| --- | --- | --- |
| 554,004 | Great Britain | June 15, 1943 |